United States Patent [19]

Ihnat et al.

[11] Patent Number: 4,831,252
[45] Date of Patent: May 16, 1989

[54] ALIGNING OPTICAL AND MECHANICAL ELEMENTS FOR OPTICAL MOTION SENSING

[75] Inventors: Dale E. Ihnat, Woonsocket, R.I.; Anthony C. Gilby, Foxboro; Richard A. Anderson, North Attleboro, both of Mass.

[73] Assignee: The Foxboro Company, Foxboro, Mass.

[21] Appl. No.: 149,787

[22] Filed: Jan. 29, 1988

[51] Int. Cl.⁴ .................................................. H01J 5/16
[52] U.S. Cl. ................................... 250/227; 250/231 R
[58] Field of Search ............. 250/227, 231 R; 73/800, 73/862.59; 374/159, 161

[56] References Cited

U.S. PATENT DOCUMENTS 4,719,341 1/1988 Hoogenboom ..................... 250/227

Primary Examiner—Edward P. Westin
Assistant Examiner—Khaled Shami
Attorney, Agent, or Firm—Terrence Martin

[57] ABSTRACT

A technique is disclosed for achieving critical alignment of optical and mechanical elements, in which one of the foregoing is movable with respect to the other. Specifically, an optical fiber (12) is aligned with respect to a movable member (19) in a first position. The movable member is then displaced to a second position and high levels of radiant energy at a first discernible wavelength are transmitted down the fiber optic path to alter, or pattern, a wavelength sensitive surface area or coating (16) on the surface of the movable member. The movable member is then freed, and radiant energy of a second wavelength to which the coating is insensitive is used to sense the position of the movable member with respect to the fiber optic.

24 Claims, 6 Drawing Sheets

ALIGNING OPTICAL AND MECHANICAL ELEMENTS FOR OPTICAL MOTION SENSING

TECHNICAL FIELD

The present invention relates to sensors for use in the process control industries, and more particularly finds application in the manufacture and assembly of optical elements. In particular, the present invention discloses a technique for achieving critical alignment of optical and mechanical elements in optically sensed resonant transducers. This is particularly useful in fiber optic driven sensors such as may be used in field-located devices which sense and communicate process control measurands (or physical parameters) to a control room. The subject matter of the invention includes products made by the method of the invention.

BACKGROUND ART

As the advantages of fiber optic based communications and control of industrial processes become better known, increasing emphasis is being placed on using various methods of simple, inexpensive and reliable communication of low level radiant energy via fiber optics to the measurement site, making the desired measurement, and returning the measurement information on the fiber optic paths to the control location. Among the many problems facing designers are practical manufacturing techniques for ensuring precise registration of optical and mechanical elements in the transducers (or the like). Of especially critical importance is precise registration of the optical fiber or fibers and the object receiving or sending the radiant energy.

More particularly, the optical fiber of an optically based transducer may be terminated at a particular fixed position within the transducer, perpendicular to a moving surface of a member or element which moves in response to a process control measurand. Such members or elements may include resonant elements or structures or other moving surfaces. The goal may include measurement of displacements as small as one micron or less.

Current technology involves careful, time consuming alignment of the respective elements, which may be further aided by mechanical or electromechanical manipulation.

The present invention eliminates the need for such critical alignment by creating an optimally-located optical target on the mechanical structure after mechanical fabrication of the structure is complete.

For the purpose of this limited description, "process control" includes both individual variable processes and complex multivariable processes involving a large number of controlled process conditions characterizable as physical parameters or "measurands", such as fluid flow, flow rate, temperature, pressure, differential pressure, level, or the like. "Resonant element" or "resonant mechanical structure" as used herein generally refers to a beam, hollow-beam, cantilevered beam and cantilevered hollow beam, and doubleor other multiple-beam elements, and ribbon, wire or other articles of manufacture, and their equivalents, all of which can be resonated at particular oscillation frequencies. Specifically included are tuning fork structures of the single- and double-ended varieties, as well as multiple tine tuning fork structures. Also included are sensors which make analytical measurements through mass change, such as by members or coatings capable of adsorbing or absorbing entities being analyzed.

As used herein, the term "radiant energy" includes energy of a wavelength between 0.1 and 100 micrometers, and specifically includes infrared, ultraviolet, and visible light energy. For simplicity, such radiant energy may be referred to generally and without limitation as "light", "light energy", or "optical power". Such radiant energy may also be described as "steady" or "continuous" or "continuous wave" in order to distinguish it from radiant energy signals which are modified to carry information. The term "radiant energy" specifically includes coherent and incoherent light energy.

"Modulation" is used broadly herein. It is intended to mean modifying (or the modification) of some characteristic or characteristics of a light beam so that it varies in step with the instantaneous value of another signal, and specifically may be used herein to describe amplitude modulation and frequency modulation. The term "steady" radiant energy as used herein refers to radiant energy having a substantially constant intensity level (that is, absent short term variations in intensity) and having substantially unchanging spectral distribution.

"Fluid" includes gases and/or liquids. The term "force" is used to describe any physical parameter or phenomenon capable of moving a body or modifying its motion, and specifically includes force exerted per unit area (pressure) and any parameter or phenomenon capable of conversion to pressure.

The term "transducer" is used to describe a device to convert energy from one form to another, and as used herein, the terms "opto-electric transducer", "electro-optic transducer", "photo-kinetic transducer," and the like more specifically describe the class of devices useful for converting radiant energy to electrical energy and electrical energy to radiant energy, or radiant energy to kinetic energy. Note that conversion to an intermediate form of energy may occur in arriving at the objective form of energy in the conversion process.

DISCLOSURE OF INVENTION

In discussing the present invention, it is assumed for descriptive purposes that an optical fiber is located perpendicular to and adjacent a surface, and the relative motion of the surface and the termination of the optical fiber with respect to one another must be carefully aligned in precise registration. For convenience in these discussions, the invention is described in terms of a fixed location optical fiber and a resonant mechanical structure exposing a movable surface to the fixed fiber end. The invention disclosed, however, is not to be limited to optical fiber/moving surface combinations in which the optical fiber is fixed in position and the moving surface is a resonant mechanical structure.

For further convenience, the concept disclosed herein is described as including a moving surface having a light sensitive coating thereon. However, the invention also encompasses apparatus in which the light sensitive material is not backed up by any portion of the moving surface per se; that is, the coating may cover an aperture in the moving member. Full equivalence is claimed for structures in which an optical characteristic of the moving surface is altered so as to modify light energy returned from the moving surface, such as by patterning the moving surface or a coating thereon.

Turning now to the invention disclosed, a moving member is locally covered over a portion of its surface with a coating which is sensitive to radiant energy at a first wavelength (Lambda 1) and insensitive to radiant energy at a second wavelength (Lambda 2). The movable member is displaced slightly from a first fixed position and sufficient Lambda 1 radiant energy is passed along the optical fiber so as to ablate (or otherwise alter) the sensitive coating, matching the optical fiber specifically as to location or position, and generally as to size, being substantially that of the optical fiber. In short, a hole is optically "machined" in the coating (or the coating is optically modified) substantially. Alternatively, laser or fiber CVD may be used, where the coating is deposited via optically assisted gas dissociation and deposition, to produce the 'target'.

Thereafter, the Lambda 2 wavelength radiant energy is passed through, absorbed by or reflected from the target when the movable surface is at its first position and less radiant energy is passed through, absorbed by or reflected from the target when the target is displaced from this first position The Lambda 2 radiant energy may be maximally blocked or maximally reflected should the movable member be sufficiently displaced.

In an alternate embodiment of the present invention, both the "modify or machine" (Lambda 1) and the "sense" (Lambda 2) wavelengths are equal, and a higher level of energy is applied via the fiber to "modify or machine" the target in the coating. Such higher level of energy must exceed the threshold level at which the surface coating can be modified. A lower intensity of energy density is used to sense the motion, which lower energy level is less than the threshold level at which the coating is affected.

BRIEF DESCRIPTION OF THE DRAWING FIGURES

Numerous other features of the invention disclosed herein will be apparent upon examination of the several drawing figures forming a part hereof, in which in all views like reference numerals indicate corresponding elements:

Figure 5:
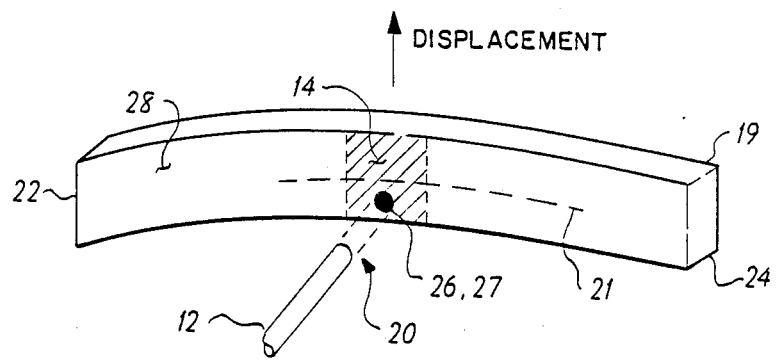
Figure 6:
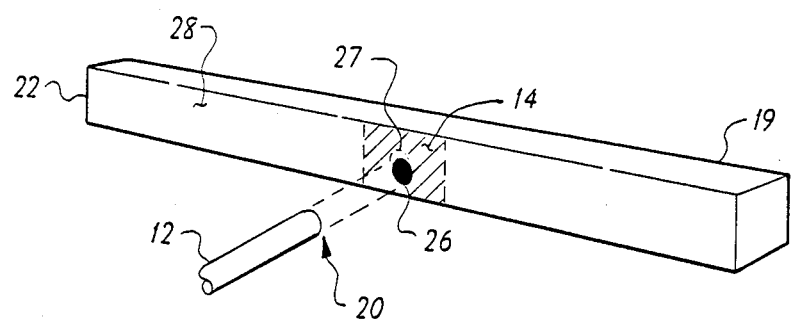
Figure 7:
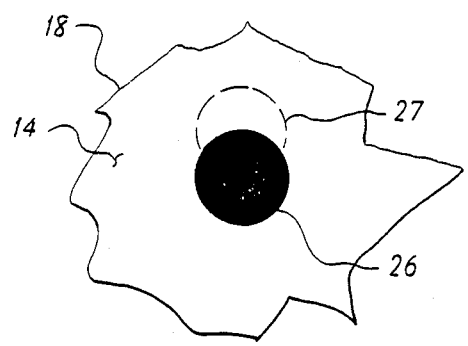
Figure 8:
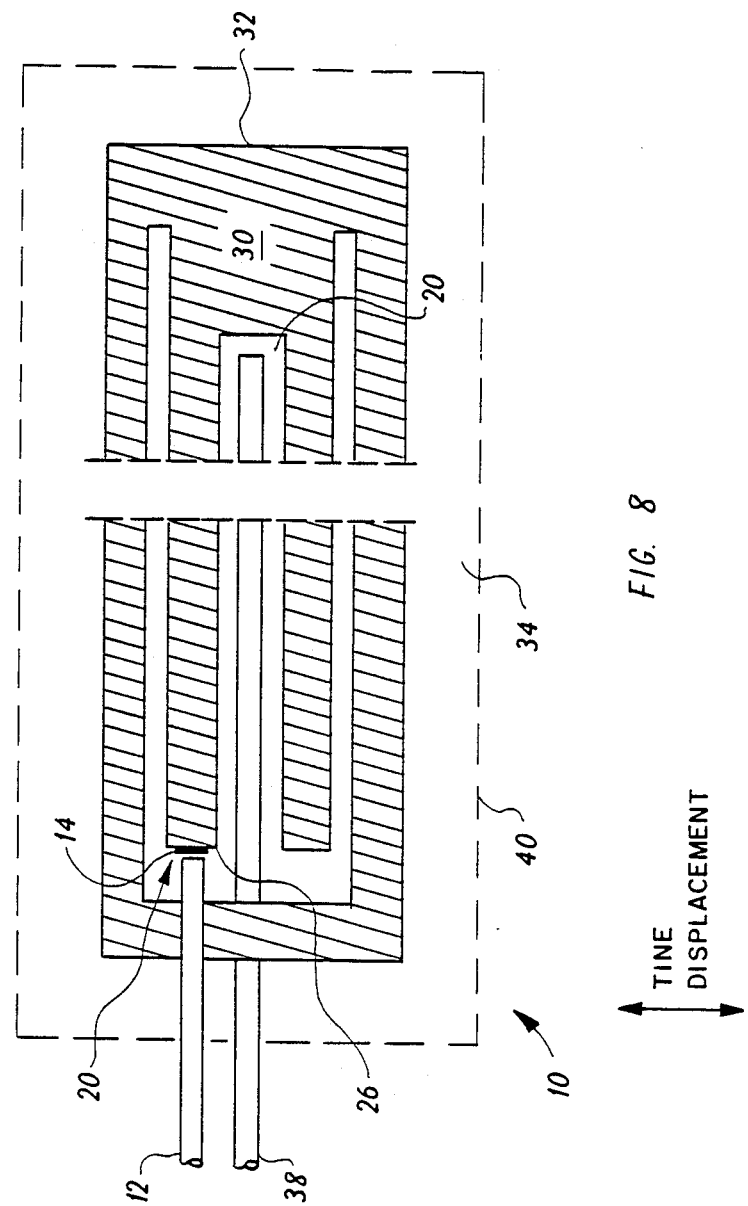
Figure 9:
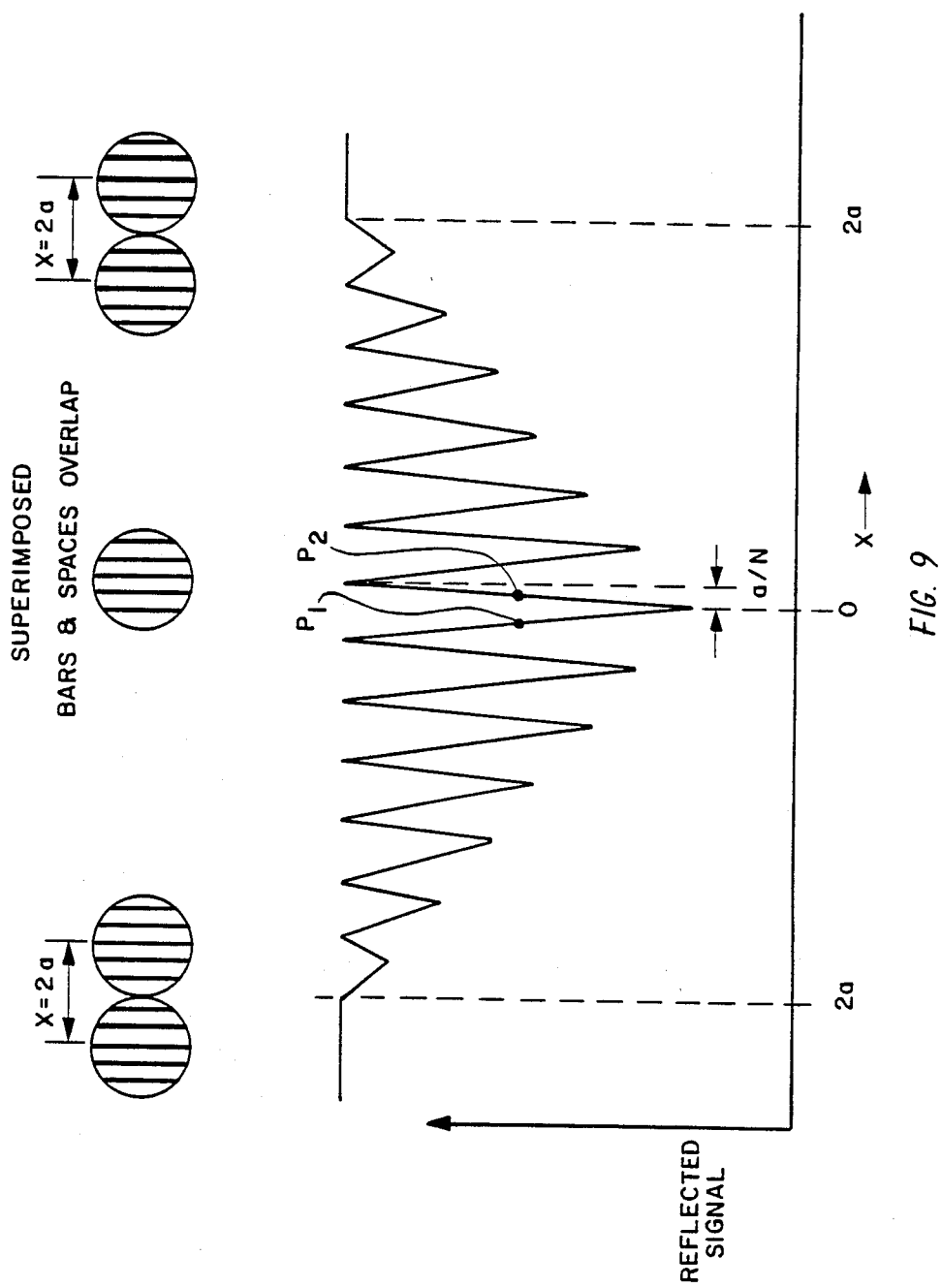

FIG 5. shows the objective target of the surface or coating area as such is modified by the "machining" application of light energy;

FIG. 6 shows the beam in its at rest position;

FIG 7 is an enlarged view of a portion of FIG. 6;

FIG. 8 illustrates as a particular example an application of the present invention in which a tuning fork based temperature sensor is optically sensed; and FIG. 9 shows a machined-in grating pattern embodiment of the invention.

BEST MODE FOR CARRYING OUT THE INVENTION

Due to the wide range of variations in carrying out the invention, this description will be limited to preferred applications known to the inventors, solely for the purpose of illustrating the invention and without limiting the scope of the invention.

Methods for altering the surface (or a coating on the surface) of the moving element include, generally, modification of single or multilayer reflective films, ablative anti-reflective layers, polymer coatings, optically enhanced film deposition, optically enhanced film removal or alteration, photoresist patterning, related other techniques, and their equivalents.

A single reflective metallic or other film may be machined or ablated with an appropriate wavelength of light, for example first wavelength Lambda 1. Lambda 1 should be communicable via the fiber and must be absorbed to some minimal degree by the film. When sufficient energy is impinged on the film, such as is sufficient to melt only the film, the surface tension of the molten material can cause it to be modified (such as by rolling or bubbling up) if the surface tension is great enough to overcome adhesion to the substrate. This general concept may be referred to hereinafter as the threshold energy intensity required for surface or coating modification. This method may be preferred to ablation, as in ablation some of the ablated material could redeposit on the surface and/or on the fiber, which would result in detection interference by scattering and partial reflection of the subsequent Lambda 2 energy. Note that at levels of incident radiation sufficient for subsequent motion sensing, wavelength Lambda 1 may equal wavelength Lambda 2 with no effect on the film other than transient heating.

Some of the materials which are known to behave in the required manner include certain metals, certain semi-metals, and certain semiconductors, and certain alloys. Among the metals are (without further limitation) cadmium, chromium, gold, indium, iron, molybdenum, nickel, silver, titanium, and zinc. Among the semi-metals are (without further limitation) antimony, arsenic, bismuth, lead, and tin. Semiconductors include (without limitation) germanium, silicon, tellurium, gallium arsenide (GaAs), germanium-tellurium (GeTe), and arsenic triselenide selenide ($AS_2Se_3$). The use of germanium-tellurium is known from encoding applications in digital optical recording.

It is well known that single or multilayer films of appropriate thicknesses and refractive indexes can be deposited on a substrate such that the reflectance of the surface is greatly enhanced or reduced at the interrogation wavelength Lambda 2. By machining these films at wavelength Lambda 1, or at a much higher energy band in the case where Lambda 1 equals Lambda 2, the optical properties of the surface can be altered. Thus, a significant difference results in the light returned to the fiber by the coating or coatings and by the machined area as they pass in front of the fiber via motion of the element.

In the case of a resonator substrate made from a transparent material such as quartz, a coating with a higher refractive index gives an increase in the surface refelectivity. The reflectivity is maximum when its thickness is:

nd=(M/4) Lambda 2, for normal incidence.

where:
n is the film refractive index
d is the thickness of the coating, and
M is an odd integer.

A suitable film material is cadmium sulfide (CdS), having a refractive index n=2.425 at a wavelength Lambda 2=700 nanometers. Using the above relationship, a CdS film 72M nanometers thick enhances the reflectivity of the quartz surface. Cadmium sulfide strongly absorbs the light if the wavelength is shorter than 520 nanometers and so the film can be machined or otherwise altered with sufficiently high power levels of Lambda 1 at less than 520 nanometers.

Note that little or no heating would occur due to impingement of Lambda 2 energy. The foregoing example is for illustration only. Many material combinations of coating materials and wavelengths operate in a similar fashion. The list below gives further examples.

| Coating Material | Lambda 1 is shorter than | Lambda 2 is longer than |
|---|---|---|
| ZnS | 0.3 micrometers | 1.4 micrometers |
| ZnSe | 0.55 micrometers | 0.65 micrometers |
| CdTe | 0.8 micrometers | 0.9 micrometers |
| GaAs | 0.8 micrometers | 1.0 micrometers |
| Si | 1.2 micrometers | 1.5 micrometers |
| Se | 1.0 micrometers | 1.0 micrometers |
| CdS | 0.5 micrometers | 0.6 micrometers |
| Ge | 2.0 micrometers | 2.0 micrometers |
| Se(+As) | 1.0 micrometers | 1.0 micrometess |

Lambda 1 can machine or otherwise alter the film at sufficiently high radiant energy intensities.

Transparent anti-reflection (AR) coatings can also be applied and machined from metallic surfaces in analogous ways. Here an AR layer (or layers) of appropriate thickness(es) and refractive index(es) result in very low reflectivity at Lambda 2. A metallic surface (coated with a film absorbing at Lambda 1 and transmitting light at Lambda 2) of thickness such that the coating - metal construction has low reflectivity at Lambda 2 can be removed or machined using sufficient light at Lambda 1. Then, at measuring wavelength Lambda 2, the coated surfaces would not reflect much light while areas machined would do so due to the exposed, highly reflective metallic surface.

Polymeric coatings can be applied to metallic surfaces such that a sufficiently high level of Lambda 1 energy can ablate the polymer at the polymer/metal interface. This opens a range of variations on this concept, in which, for example, an AR polymeric layer is ablated or otherwise removed to expose a reflective metal layer behind.

A polymer which has been only partially removed (as by ablation) can move the surface closer to the fiber by producing a bulging or bubbling of the polymer resulting from trapped vapor. The bulge thus alters the reflective (or anti-reflective properties of the construction by changing the fiber to surface spacing, resulting in large signal difference between reflections from the modified and unmodified surfaces.

The polymer can also be charred. Energy of sufficient intensity at a given wavelength can also char or modify the surface of the polymer so as to result in a localized change of color which could absorb the Lambda 2 wavelength energy and result in a substantial signal difference.

Polymers can be applied to the apparatus by dipping, spraying, spinning, or chemical vapor deposition (CVD) or by plasma sputtering. They can be tailored to suit specific Lambda 1 and Lambda 2 requirements. Similar work has been carried out generally by digital recording media researchers.

Film deposition can be optically enhanced by thermally enhanced decomposition of a reactive gas on or above a surface. The present invention comprehends application of light energy communicated via a fiber to heat the substrate in a CVD process wherein a metal or metallic compound is deposited only in the exposed area or areas, in the presence of an appropriate vapor. Several metal halides exist which behave in this manner. Reactions produced by heat include (without limitation):

| This compound: | becomes this compound |
|---|---|
| $TiCl_4 + 2H_2$ | $Ti + 4HCl$ |
| $TiCl_4 + CH_4$ | $TiC + 4HCl$ |
| $TiCl_4 + 2H_2 + 2CO_2$ | $TiO_2 + 4HCl + 2CO$ |
| $Al(CH_3)_3 + 3/2H_2$ | $Al + 3CH_4$ |
| $Ni(CO)_4$ | $Ni + 4CO$ |

Using an optical input to expose photoresist (either positive or negative), and the equivalents thereof, can be used. Here, the exposed area would either be degraded (positive) or cross-linked (negative) such that the exposed area could be removed (positive) or the non-exposed area could be removed (negative). A precise reflective pattern could be left in place using this alternative method. Wavelength Lambda 1 could equal wavelength Lambda 2 and no more energy would be required to process or interrogate. A suggested process (for negative photoresist) is:

1. Coat the substrate with metal.
2. Apply photoresist (using conventional microcircuit techniques).
3. Position fiber and surface to desired relative position.
4. Expose.
5. Remove unexposed resist.
6. Etch metal.
7. Strip exposed resist, leaving exposed metal area behind.

It should be noted that the specific process embodied above should avoid damage to exposed portions of the fiber.

Using any of these techniques, the end of the fiber may be prepatterned with a preferred pattern, such as a grating, to provide a matching written pattern. This will enhance the sensitivity to motion by establishing a system of Moiré fringes. Large core fibers can be used to give the same high spatial resolution of a much smaller core fiber, with the advantage of greater light energy throughput.

Other equivalent and/or analogous alternatives are included within the scope of the present invention. A number of complex multilayer processes are known to those skilled in this art. Any photoinduced or enhanced process is a candidate for write-in-place alignment of movable mechanical elements. Simple bar or spot patterns of stable photoresist (and their equivalents), due to their optical nature, could alter the signal.

Figure 1:
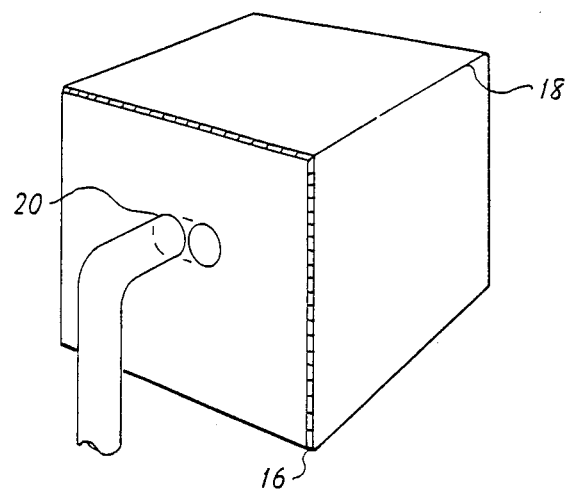
FIG. 1 is a simple illustration of the invention for discussion purposes.

There is shown in FIG. 1 the basic elements of the invention, including optical fiber pathway or fiber 12, a surface coating 16 on a substrate 18, and fiber tip or end 20.

In FIG. 1, radiant or light energy (not shown) is directed along an optical fiber from a remote source (also not shown). The fiber may be a singlemode fiber, or a multimode fiber. The light, reaching fiber tip or end 20 is directed to the surface of a substrate 18 which may be at least partially coated with one or more surface compound coatings 16 (the thickness shown is exagerated for illustration).

Figure 2:
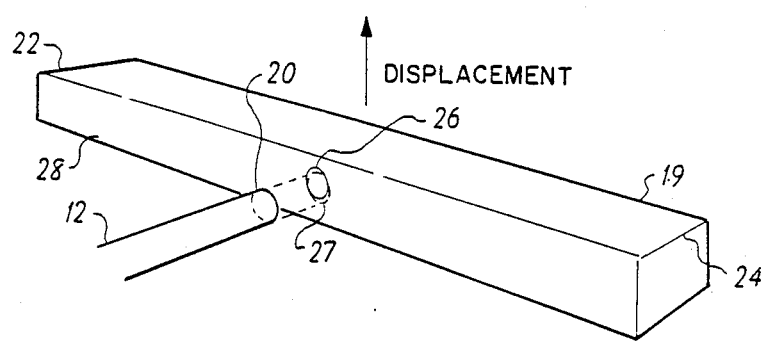
FIG. 2 shows application of the inventive concept to a resonant beam member.

In FIG. 2 are shown fiber 12, fiber end 20, fixed beam ends 22, 24 of a resonant beam 19, target 26, illuminated area 27, and resonator surface 28.

FIG. 2 shows the basic elements of the invention as used with a resonant element. A resonator 19 shown here as a beam having ends 22, 24 fixed in place (the mountings are not included within the scope of the present invention and thus are not shown in the figure) is vibratable at an angle (generally perpendicular) to an optical fiber 12. Continuous Lambda 2 light energy is carried via the fiber 12 to fiber end 20, where the light becomes incident on the resonator 19 at illuminated area 27. Note that the spacing between the fiber 12 tip or end 20 and the resonator 19 should be closely spaced with respect to resonator 19 surface 28. The light energy from the fiber 12 may be somewhat divergent, so the fiber should be close to the beam. Optionally, a lens or other focussing means could image the end of fiber 20 on to the resonator surface 28, thus allowing a larger physical separation. Resonator 19 surface 28 may include a surface coating, as described herein. A portion of the light may be reflected back along into the fiber 12 to be conveyed to the remote site (not shown). As the resonator 19 moves, the reflectivity of the illuminated surface 28 at target 26 differs from the rest of the surface, so that the light received at the remote site is modulated at the resonant frequency of the resonator 19.

The purpose of the invention is to produce a reflectivity contrast in proper relation to the fiber after assembly and without need for further precise mechanical positioning of the fiber with respect to the resonator.

Figure 3:
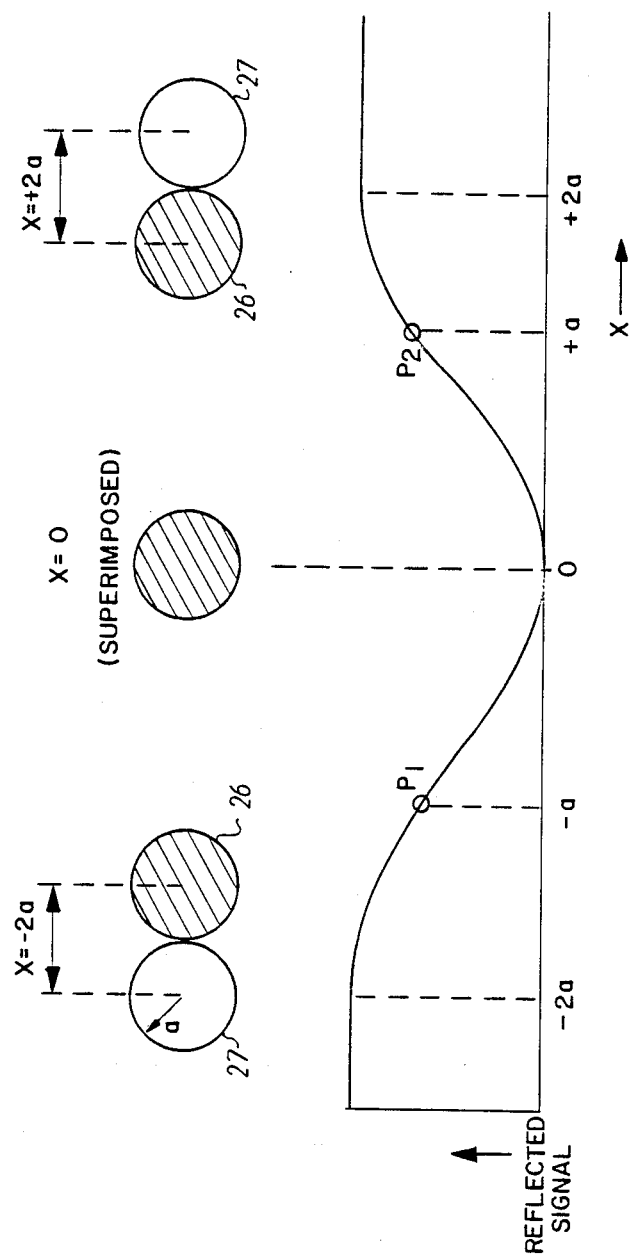
FIG. 3 illustrates the relative reflected light energy values as the source light energy is modulated by relative motion between the fiber tip and the sense target.

Now turning to FIG. 3, there are shown the target 26 and illuminated area 27 in various relative positions as the resonator 19 (of FIG. 2) vibrates. Locations $P_1$ and $P_2$ represent positions of maximum sensitivity of reflected light to resonator 19 motion. When the resonator 19 oscillates over a small amplitude it is most easily detected optically when the illuminated area and target 26 overlap by half their diameter "X" is the displacement of the resonator target 26 with respect to the illuminated area 27.

It is assumed for the present purposes that the target 26 is about the same size as the fiber 12 core. If not, the center of the fiber 12 may desirably line up with the edge of the target 26. The relative signal amplitude produced by reflection of the light is seen to be maximum when the edge of the target 26 is displaced beyond the fiber tip 20 and illuminated area 27 such that no light is absorbed by the target.

Figure 4:
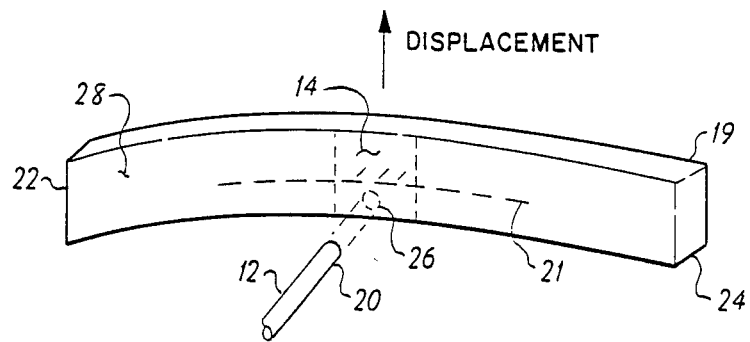
FIG. 4 illustrates how the optical and mechanical elements are arranged for modification of the substrate surface or coating.

In FIG. 4 are shown the fiber 12, a limited coating or surface area 14, resonator 19, fiber tip 20, fixed beam ends 22 and 24, target area 26, and the resonator surface 28.

FIG. 4 is a view of the optical and mechanical elements of the invention prior to modification of tee surface or light sensitive coating; here, resonator 19 is displaced by about ½ the width of the illuminated spot. The broken line 21 of FIG. 4 indicates the unstressed position with respect to the fiber, when the circle 26 should just touch the broken line.

FIG. 4 shows the resonator 19 displaced in position relative to the optical fiber 12 in preparation for optically modifying the target area 26 of light sensitive optically modifiable coating or surface 14, where exposure to Lambda 1 optical energy changes its reflectivity. Reference line 21 represents the equilibrium position of the resonator relative to the fiber tip 20 and illuminated area 26. This may be accomplished by loading the structure through application of a force (which may be a predetermined force) to the fixed mounting ends 22, 24 of the resonator in order to create a static relative displacement, or by driving the resonator, perhaps piezoelectrically, away from its static or at-rest position so that FIG. 4 illustrates the extreme of motion. In the latter case, subsequent surface or coating 16 modification (see FIG. 5 and discussion, infra) is done with a pulse of Lambda 1 light energy, much shorter than the resonator's period of oscillation. In the case of a static displacement of fiber tip 20, Lambda 1 irradiation may be continuous or pulsed.

The spot is modified by intense light energy at wavelength Lambda 1 while the resonator 19 is in the displaced position.

FIG. 5 shows the optical and mechanical elements of the invention at the time of exposure to the Lambda 1 radiant energy. Included are fiber 12, coated area or surface 14, resonator 19, fiber tip or end 20, fixed beam ends 22, 24, illuminated area 27 superposed on modified target area 26, and resonator surface 28. The resonator 19 is displaced the desired amount and the surface or coating 14 has been "written" to.

FIG. 6 shows the optical and mechanical elements of the invention after exposure to the Lambda 1 radiant energy and with the resonant beam in its mechanically neutral position Included are fiber 12, limited coated area or surface 14, resonator 19, fiber tip or end 20, fixed beam ends 22, 24, target 26, illuminated area 27, and resonator surface 28. Here, small motions of the resonator 19 with respect to fiber tip 20 surface 28 result in modulated light transmission or reflection.

The motion of the surface of resonator 19 relative to illuminated area 27 is shown more clearly in the enlarged view of FIG. 7, which view includes the limited coated area 14, substrate 18, target area 26, and illuminated area 27.

FIG. 8 shows the invention as it may be used in a practical optically based transducer application. A miniature optical resonant temperature sensor 10 is shown. This example is given for illustration only and not for limitation of the appended claims.

The fibers are located in the plane of the fork leading to a compact structure suitable for mounting in a process thermowell, which may be a cylindrical cavity with an inside diameter (for example) of 6 millimeters (¼" ID).

Illustrated are fiber 12, surface or coating 14 with modified surface target 26, fiber tip or end 20, a tuning fork 30, tuning fork mount 32, excitation fiber 38, and housing 40, which may be sealed. In a tuning fork temperature sensor, the resonant frequency changes with temperature due to the temperature coefficient of its material properties. The interior of the device may be maintained in a vacuum, represented by 34. Fiber feedthroughs (not shown) may be used, especially in the event that the interior is maintained in such an evacuated state.

Excitation fiber 38 carries pulses of light modulated at the resonant frequency. Its operation is described below. Sense fiber 12 carries continuous Lambda 2 light to the tuning fork crotch 37, which moves the tines as a result of the modulated light causing localized heating. As the tuning fork tine moves back and forth relative to fiber 12 end 20, variable intensity light is reflected back as target 26 moves relative to the fiber tip 20. Modulated Lambda 2 radiant energy thus returns to the remote control unit (not shown) along the sense fiber 12 and is processed to both (a) give the frequency output, and (b) drive the excitation light source to maintain resonant oscillations via fiber 38.

Optical drive of the tuning fork element 30 may be accomplished by pulses of light at the resonant frequency absorbed by a photothermally active region in the crotch of the fork. This effect is shown in copending application 06/755,646, assigned to the assignee of the present invention. Motion sensing of the tuning fork 30 is accomplished on the end surface of a fork tine by a surface modified target as disclosed in the present invention. Such a target would include surface or coating 14 in which the target was optically machined or otherwise formed at 26 adjacent the fiber tip or end 20 as described herein.

In FIG. 9 a grating pattern of N equal width opaque bars and spaces is first applied to the end of the fiber, which has a diameter of $2a$. This is mounted adjacent to the photosensitive area on element 28. The element 28 is then displaced perpendicular to the grating bars of the fiber by a quarter period of the grating, e.g., $(2a/N)/4$, from its normal unstressed position. The photosensitive area is modified by optical power at Lambda 1, directed along the fiber. This creates a set of matching stripes of modified optical properties in the target area 26. Thus, as shown in the idealized plot of reflected signal versus displacement of the element with respect to the fiber, a series of maxima and minima will result. The most sensitive locations about which to sense small motions are at locations $P_1$ and $P_2$, one of which is the unstressed position of the element 28.

The reflected signal changes from maximum to minimum in a distance $X=a/N$. Compared with a fiber of the same diameter without a grating pattern this is a factor of $2N$ times more sensitive. (Compare FIG. 3.) This allows a fiber of relatively large diameter to be used to obtain the spatial resolution of a much smaller fiber, but with the advantage of greater Lambda 2 optical power at the resonator station.

The grating period must not be made so small that diffraction effects wash out the fringe definition.

Other patterns may be used in place of the simple grating described, and may be useful for detecting motion in two dimensions rather than just one dimension.

The motion of a wide variety of resonant structures, useful as sensors, may be detected in this way.

Thus numerous advantages of the present invention have been set forth in detail above.

Although preferred embodiments of the invention have, been described above, the descriptions are solely for the purpose of illustration and not intended to be limiting. Numerous modifications will become apparent to those of skill in this field of endeavor. For example, the invention has been described as operating with a tuning fork resonant element having at least one moving surface, in which resonant motion is activated by the conversion of light energy to localized heating of the resonator. It will be understood that other techniques could be devised for applying the energy to the sensor to effect resonant physical motion without departing from the scope o this invention as defined in the accompanying claims.

We claim:

1. Apparatus forming a part of an optical motion sensing means including mechanical and optical elements for precision alignment of said mechanical and optical elements, in which said optical element is an optical fiber, comprising:

(a) an optical fiber element having a terminated local end portion and a remote portion;
    (b) a mechanical element having a light sensitive surface disposed near said optical fiber local termination, in which a first one of the optical fiber or mechanical elements is movable with respect to the other, second element;
    (c) releasable means for temporarily displacing the first element from a rest position to a desired alignment position in juxtaposition with an area of the light-sensitive surface;
    (d) radiant energy source means coupled through said optical element for optically altering the optical properties of said light sensitive surface; and
    (e) means for releasing displacement of said first element and restoring same to its rest position.

2. Apparatus as in claim 1 wherein said light sensitive surface is wavelength-specific and said radiant energy source means produces a first energy of the light sensitive coating modifying wavelength.

3. Apparatus as in claim 2 further including a second energy wavelength incapable of modifying the light sensitive coating.

4. Apparatus as in claim 1 wherein said radiant energy source means includes a first power level for modifying the light sensitive coating.

5. Apparatus as in claim 1 wherein said radiant energy source means further includes a second power level which is incapable of modifying the light sensitive coating.

6. Apparatus as in claim 1 wherein said optical fiber terminating end includes an at least partially light-blocking pattern.

7. Apparatus as in claim 1 further including imaging means for forming an image of the fiber termination end onto the mechanical element light sensitive coating.

8. Apparatus as in claim 1 in which the light sensitive coating includes a material selected from the group which includes cadmium, chromium, gold, indium, iron, molybdenum, nickel, silver, titanium, and zinc.

9. Apparatus as in claim 1 in which the light sensitive coating includes a material selected from the group which includes antimony, arsenic, bismuth, lead, and tin.

10. Apparatus as in claim 1 in which the light sensitive coating includes a material selected from the group which includes germanium, silicon, tellurium, gallium arsenide, germanium-tellurium, and arsenic triselenide.

11. The method of modifying the optical properties of a light-sensitive surface of a movable member element precisely displaced from a terminating end of an optical fiber element, comprising:

(a) generating radiant energy of a wavelength an power level sufficient to modify the light sensitive surface of the movable member;
    (b) bringing the terminating end of the optical fiber in close proximity with the light-sensitive surface at a rest position relative to an area of the light-sensitive surface;
    (c) displacing from its at-rest position a first one of the elements with respect to the other element such that the optical fiber will convey optical energy to the desired area of the light-sensitive coating;
    (d) coupling the radiant energy source to the optical fiber;
    (e) directing optical power from the optical fiber onto the desired portion of the light-sensitive surface until the surface coating is desirably modified; and (f) releasing the first element to its at-rest position.

12. In the method of claim 11, and wherein the light sensitive surface is wavelength-sensitive, generating in step (a) first radiant energy of the same wavelength as the wavelength-sensitivity of the light sensitive surface.

13. The method according to claim 12, further including generating and coupling to the optical fiber a second wavelength to which the light sensitive surface is insensitive.

14. In the method of claim 11 generating in step (a) first radiant energy of the sufficient power to modify the surface morphology of the light sensitive surface.

15. The method according to claim 14, further including generating and coupling to the optical fiber a second radiant energy power level insufficient to modify the light sensitive surface.

16. The method according to claim 11 wherein the optical fiber terminating end includes a light-blocking pattern.

17. The method according to claim 11 further including the step of forming an image of the fiber termination end onto the mechanical element light sensitive coating.

18. The method according to claim 11 wherein the displacing of said first element is accomplished by application of a force to the element.

19. The method according to claim 18 wherein the displacing of said first element is accomplished by application of a predetermined force to the element.

20. The method according to claim 11 wherein the displacing of said first element is accomplished by driving the resonator away its at-rest position.

21. The method according to claim 20 wherein the displacing of said first element is accomplished by driving the resonator away its at-rest position piezoelectrically.

22. The method of depositing a metal halide and modifying the optical properties of said metal halide on the surface of a movable member element precisely displaced from a terminating end of an optical fiber element, comprising:
  (a) coating the movable member over at least a portion of its surface with the desired metal halide;
  (b) applying a light-sensitive photoresist to the surface of the metal halide;
  (c) bringing the terminating end of the optical fiber in close proximity with the light-sensitive photoresist surface at a desired position relative to an area of the light-sensitive photoresist surface;
  (e) displacing the movable member element from its at rest position to the desired optical write position;
  (f) coupling a radiant energy source to the optical fiber to expose the photoresist;
  (g) removing the undesired resist;
  (h) etching the metal halide;
  (i) stripping the exposed resist, thus leaving the exposed metal halide area behind; and
  (j) releasing the first element to its at-rest position.

23. The method according to claim 22 wherein the optical fiber terminating end includes a light-blocking pattern.

24. The method according to claim 22 further including the step of forming an image of the fiber termination end onto the photoresist.

* * * * *